(12) United States Patent
Scothern (10) Patent No.: US 10,119,420 B2
(45) Date of Patent: Nov. 6, 2018

(54) SEAL

(71) Applicant: ROLLS-ROYCE plc, London (GB)

(72) Inventor: David P Scothern, Derby (GB)

(73) Assignee: ROLLS-ROYCE PLC, London (GB)

( * ) Notice: Subject to any disclaimer, the term of this patent is extended or adjusted under 35 U.S.C. 154(b) by 266 days.

(21) Appl. No.: 15/171,577

(22) Filed: Jun. 2, 2016

(65) Prior Publication Data
US 2017/0002686 A1    Jan. 5, 2017

(30) Foreign Application Priority Data

Jun. 30, 2015  (GB) .................................. 1511456.4

(51) Int. Cl.
| | |
|---|---|
| F16J 15/40 | (2006.01) |
| F16J 15/42 | (2006.01) |
| F01D 25/18 | (2006.01) |
| F02C 7/28 | (2006.01) |
| F01D 11/04 | (2006.01) |

(Continued)

(52) U.S. Cl.
CPC .......... *F01D 25/183* (2013.01); *F01D 11/003* (2013.01); *F01D 11/04* (2013.01); *F01D 11/10* (2013.01); *F02C 7/28* (2013.01); *F16J 15/40* (2013.01); *F16J 15/42* (2013.01); *F05D 2220/32* (2013.01); *F05D 2240/55* (2013.01); *F05D 2260/98* (2013.01)

(58) Field of Classification Search
CPC . F16J 15/40; F16J 15/406; F16J 15/42; F01D 11/04; F01D 25/183; F05D 2240/55; F02C 7/28
See application file for complete search history.

(56) References Cited

U.S. PATENT DOCUMENTS

| | | | |
|---|---|---|---|
| 3,765,688 A | 10/1973 | Junker | |
| 4,570,947 A * | 2/1986 | Smith | ...................... F16J 15/42 277/428 |

(Continued)

FOREIGN PATENT DOCUMENTS

| | | |
|---|---|---|
| EP | 2 177 795 A1 | 4/2010 |
| JP | 2009019609 A | 1/2009 |

OTHER PUBLICATIONS

Dec. 29, 2015 Search Report issued in British Patent Application No. 1511456.4.

*Primary Examiner* — Nicholas L Foster
(74) *Attorney, Agent, or Firm* — Oliff PLC (57) ABSTRACT

A hydraulic seal arrangement including first and second rotatable components, the first defining a first annular trough defined by radially inwardly extending first and second walls, the second component defining a radially outwardly extending web between the walls. The first component includes a second trough defined by the second wall and a third wall axially spaced from the second, the second trough defining an open radially inner end defined by a radially inner end of the second wall such that the first and second annular troughs fluidly communicate around the circumference of the first component via the inner end of the second wall. At a first circumferential position, the second wall of the first component defines a second trough oil inlet providing further fluid communication between the first and second troughs and at a second circumferential position, the third wall of the first component defines a second trough oil outlet.

16 Claims, 7 Drawing Sheets

(51) Int. Cl.
    *F01D 11/00*     (2006.01)
    *F01D 11/10*     (2006.01)

(56) References Cited

U.S. PATENT DOCUMENTS

| | | | | |
|---|---|---|---|---|
| 6,164,658 | A * | 12/2000 | Collin | F01D 11/02 277/418 |
| 6,568,688 | B1 | 5/2003 | Boeck | |
| 6,845,987 | B2 * | 1/2005 | McCutchan | F16J 15/42 277/411 |
| 6,921,079 | B2 * | 7/2005 | Rensch | F01D 11/00 277/428 |
| 7,159,873 | B2 * | 1/2007 | McCutchan | F16J 15/3448 277/427 |
| 8,444,153 | B2 * | 5/2013 | Gaebler | F01D 11/04 277/412 |
| 9,133,939 | B2 * | 9/2015 | Scothern | F16J 15/42 |
| 9,157,532 | B2 * | 10/2015 | Greaves | F01D 11/04 |
| 2003/0168815 | A1 * | 9/2003 | Rensch | F01D 11/00 277/409 |
| 2004/0046325 | A1 * | 3/2004 | McCutchan | F16J 15/3448 277/411 |
| 2005/0098956 | A1 * | 5/2005 | McCutchan | F16J 15/3448 277/353 |
| 2009/0189356 | A1 * | 7/2009 | Gaebler | F01D 11/04 277/431 |
| 2010/0090415 | A1 * | 4/2010 | Scothern | F16J 15/42 277/431 |
| 2014/0158232 | A1 | 6/2014 | Greaves | |

* cited by examiner

SEAL

This invention relates to seals. In particular, although not exclusively, it relates to hydraulic seals of the type used to provide a seal between two relatively rotating shafts.

It is known to use a hydraulic seal to seal between two relatively rotating shafts. U.S. Pat. No. 6,568,688 describes such a seal, in which oil is continuously fed from the low-pressure side of the seal, passes through the seal to provide cooling, and is recovered to the low-pressure side of the seal for scavenging.

Figure 1:
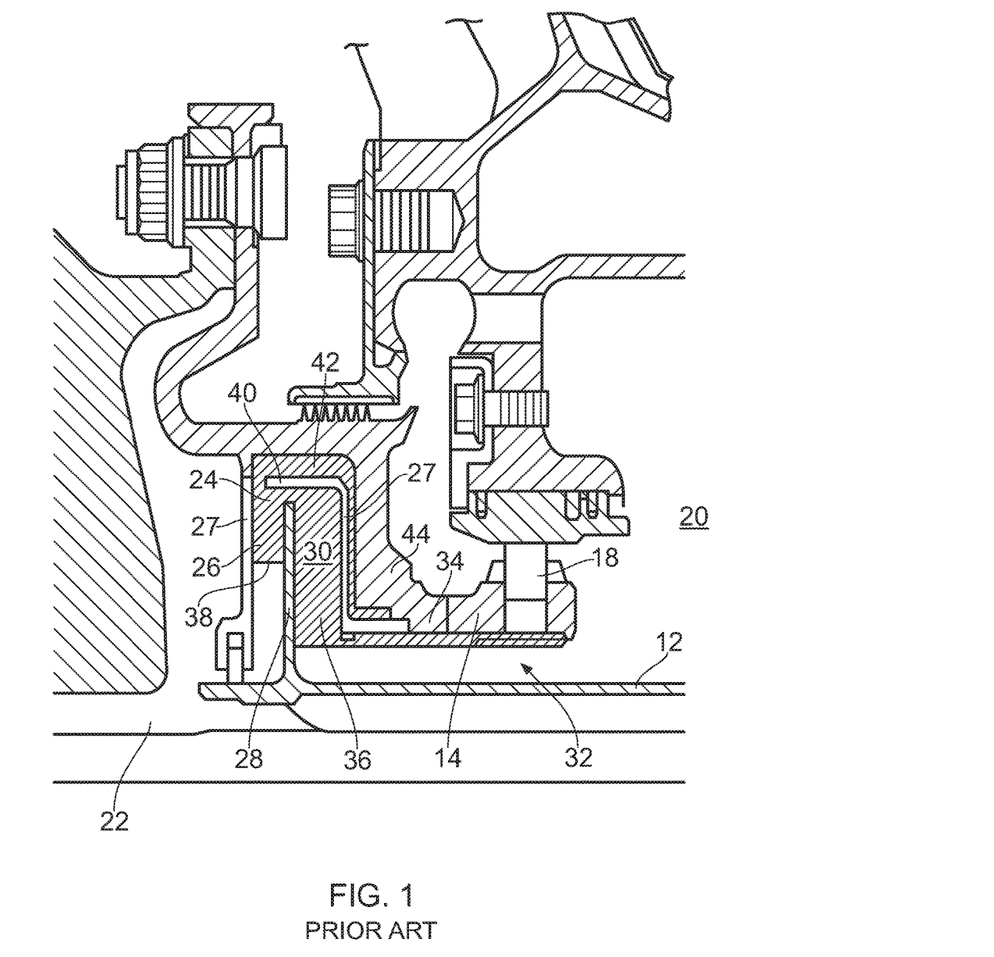
FIG. 1 is a section through a prior hydraulic seal arrangement.

FIG. 1 is a sectional view, at top dead centre, of a known hydraulic seal arrangement, as described in U.S. Pat. No. 6,568,688. A low pressure shaft 12 and a high pressure shaft 14 are concentric shafts of a two-shaft gas turbine engine, rotating at different speeds (with the high pressure shaft generally rotating at a higher speed than the low pressure shaft in use) about a common axis of rotation 16. The high pressure shaft 14 is supported on a bearing 18.

To the right-hand side of bearing 18, and radially outward of high pressure shaft 14, is a region 20 of relatively low pressure; and to the left-hand side of bearing 18, and radially inward of high pressure shaft 14, is a region 22 of relatively high pressure. The two regions 20 and 22 must be effectively sealed from each other in operation, and to achieve this a hydraulic seal, indicated generally by 24, is provided between the two shafts 12 and 14.

The hydraulic seal 24 comprises an annulus 26 which is provided in the interior of the high pressure shaft 14 and extends radially outwards across the whole circumference of the shaft 14. The annulus is defined by radially inwardly extending walls 27, which extend around the whole circumference of the shaft 14. Projecting into the annulus 26 is a web 28 which is arranged on the low pressure shaft 12 and extends radially outward across the whole circumference of the shaft 12.

In operation, a large portion of the annulus 26, and especially that portion of it that surrounds the free end of the web 28, is filled with oil or some other hydraulic medium 30, as indicated by the hatched area.

In operation, a continuous feed of oil is maintained into the annulus 26, in the following manner. An oil jet (not shown) between the two shafts 12, 14 delivers oil in the direction shown by the arrow 32. Some of this oil serves to lubricate the bearing 18; the remainder tends to collect on the inner wall 34 of the high pressure shaft 14, owing to the centrifugal effects arising out of the rotation of the shafts 12, 14. The inner wall 34 lies at the radially outward side of the space between shafts 12 and 14.

It is also possible, in an alternative embodiment of the known arrangement, for the oil to be fed in along the centre of the hollow shaft 12.

Again under centrifugal effect, oil also enters the annulus 26 through an annular inlet area 36, the annulus 26 lying still further radially outward than the inner wall 34. In the process, the oil 30 collects in the annulus 26 both to the left and to the right sides of the web 28, creating an optimum siphon-type hydraulic seal as shown.

It will be appreciated that the radially inwardly extending side walls defining the annulus 26 act as weirs and limit the oil level within the annulus. The surface or liquid level of the oil, on each side of the web 28, will be ultimately constrained by the radially inward extension of the respective side wall. This can be seen in the annular inlet area 36.

On the left-hand side of the web 28, the surface or liquid level 38 of the oil 30 is further radially outward than on the right-hand side of the web 28, because the left-hand side communicates with the region 22, in which the pressure is higher than in the area 20 with which the right-hand side is in communication.

A scoop plate 40 in the annulus 26 defines a passageway 42, through which excess oil can flow to an outlet duct 44. In this way, a continuous flow of oil is maintained through the hydraulic seal 24. (Other ways of achieving throughflow are known, and will be familiar to the skilled reader of this specification; for example, oil may flow over one of the weirs, typically on the opposite side of the web 28 to the oil jet.) This prevents undesirable overheating and coking of the oil 30, which would occur if the oil was allowed to remain for too long within the annulus 26. In general, the amount of heat transferred to the oil is highly dependent on the depth of immersion of the fin 28 in operation.

A problem with known hydraulic seal arrangements, as shown in FIG. 1 and described above, is that at engine shutdown, the centrifugal effects that maintain the seal cease, and consequently the seal collapses under gravity. Oil will collect in the bottom of the seal to the level of the largest-diameter weir (i.e. that weir which, viewed from the bottom dead centre of the engine, extends least far in the radially inward direction). Any excess oil will overflow the weir and be lost. When the engine is restarted, the centrifugal effects will cause the retained oil to be evenly distributed around the circumference of the seal arrangement. If the amount of retained oil is insufficient to remake an effective hydraulic seal (by submerging the web), then the seal will leak until enough new oil has been delivered into the annulus.

If the weir diameter is made smaller (i.e. the weir is made to extend further radially inward), then more oil can be retained at shutdown, and so the seal can be remade more quickly; but a smaller diameter weir will cause the web to be more deeply immersed in the oil during normal running, and this will increase the amount of heat transferred to the oil during normal running.

The design of hydraulic seal arrangements has in the past been constrained by the need to balance these two contradictory and undesirable situations, avoiding on the one hand a seal that leaks at start-up and on the other a seal that transfers excessive heat to the oil in use.

A further prior seal arrangement is described in applicant's prior patent EP 2177795. In that arrangement, a hydraulic trap is provided, which retains a high volume of oil on engine shut down, without requiring a smaller weir diameter. However, in the design described in EP 2177795 both a primary hydraulic seal and a secondary hydraulic trap are provided in one component. This is necessary since oil is introduced from the front bearing chamber of the gas turbine engine and sprayed into the primary hydraulic seal in the application for which EP2177795 is designed. This oil flows through the seal and must then be returned to the bearing chamber for scavenging. This oil return is achieved via the secondary hydraulic trap, which must be capable of withstanding the same pressure drop as the main seal if it is not to represent a route by which the main seal may be bypassed by the airflow which the seal is designed to prevent. The secondary hydraulic trap relies for its function on an enclosed passage extending circumferentially between first and second circumferential positions. Incorporating this passage in a rotating component requires a difficult manufacturing process incorporating a number of welds, and is therefore expensive and time consuming to manufacture.

The inventors have devised a hydraulic seal arrangement that reduces or substantially overcomes the problems associated with known hydraulic seal arrangements, permitting a seal without excessive immersion of the web during normal running, but in which sufficient oil can be retained on shutdown to permit an effective hydraulic seal to be remade almost immediately when the engine is restarted, and which can be manufactured at low cost.

According to a first aspect of the present invention there is provided a hydraulic seal arrangement for a rotating machine comprising:

first and second relatively rotatable components, the first component defining a first annular trough defined by radially inwardly extending axially spaced first and second walls, the second component defining a radially outwardly extending web extending between the radially inwardly extending walls of the first component; the first component further comprising:

a second trough defined by the radially inwardly extending second wall and a radially inwardly extending third wall axially spaced from the second radially extending wall, the second trough defining an open radially inner end defined by a radially inner end of the second radially extending wall such that the first and second annular troughs fluidly communicate around substantially the whole circumference of the first component via the radially inner end of the second radially extending wall; wherein at a first circumferential position, the second radially inwardly extending wall of the first component defines a second trough oil inlet providing fluid communication between the first and second annular troughs; and at a second circumferential position, the third radially extending wall of the first component defines a second trough oil outlet.

Advantageously, the arrangement provides a seal which is capable of retaining a large volume of oil at shutdown, while requiring relatively low oil levels during operation. The arrangement can be manufactured using only machining operations, with no welding operations being necessary to produce the arrangement, since no enclosed circumferentially extending passage is necessary.

The first and second radially extending walls of the first component may be axially spaced by a first axially extending wall provided at a radially outer end of the first and second radially extending walls. The second and third walls may be axially spaced by a second axially extending wall provided at a radially outer end of the second and third radially extending walls.

The second trough may define a first volume at the first circumferential position. The second trough may define a second volume at the second circumferential position. The second volume may be equal to or greater than the first volume. Advantageously, oil is prevented from being removed from the second trough via the second aperture when the first component is rotating slowly. Consequently, oil is available for forming the seal immediately on start-up due to the absence of communication between the first trough and second trough oil outlet when the first circumferential position is at bottom dead centre at low rotational speeds, and due to the relative volumes of the second trough at the first and second circumferential positions.

The second trough oil inlet may comprise a first aperture provided in the second radially extending wall, and the second trough oil outlet may comprise a second aperture provided in the third radially extending wall. The second trough oil inlet and second trough oil outlet may be located at the same radial position.

The second trough oil inlet may be located radially inwardly from a radially outer end of the radially outwardly extending web of the second component.

The second and third walls of the first component may be axially spaced to a greater extent at the second circumferential position than at the first circumferential position. At the first circumferential position, the second axially extending wall may be located at a first radial position, and at the second circumferential position, the second axially extending wall may be located at a second radial position radially outwardly of the first radial position.

The second trough oil inlet and oil outlet may be circumferentially spaced by 90° from one another. A pair of second trough oil inlets and a pair of second trough oil outlets may be provided at diametrically opposite circumferential positions.

The rotating machine may comprise a gas turbine engine. A first shaft of the gas turbine engine may comprise or may be coupled to the first component, and a second shaft of the gas turbine engine may comprise or may be coupled to the second component. The first shaft may comprise a relatively higher rotational speed in use shaft and the second shaft may comprise a relatively lower rotational speed in use shaft. The first and second shafts may be arranged coaxially.

The hydraulic seal arrangement may comprise an oil delivery arrangement configured to deliver a supply of oil to the seal arrangement. The oil delivery arrangement may be configured to deliver oil to a first axial side of the first trough. The second trough may be located at a second, generally opposite axial side of the first trough.

According to a second aspect of the present invention, there is provided a gas turbine engine comprising a hydraulic seal arrangement in accordance with the first aspect of the present invention.

So that the operation of the invention may be more clearly understood, an exemplary embodiment will now be described with reference to the accompanying drawings, in which:

FIGS. 2 to 7 show a first hydraulic seal arrangement. In each of the figures, the radial direction is indicated by arrows R and the axial direction is indicating from the arrow A.

Figure 2:
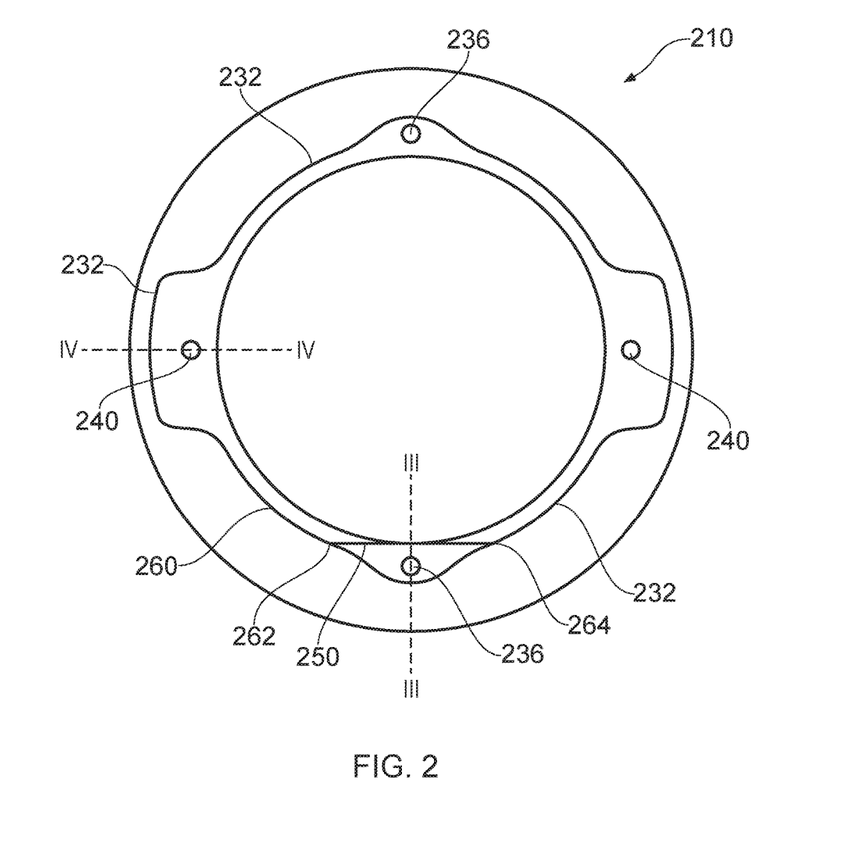
FIG. 2 is a section through a first hydraulic seal arrangement according to the invention at a first rotational position.

Referring first to FIG. 2, a hydraulic seal arrangement according to the invention is shown generally at 210.

Figure 4:
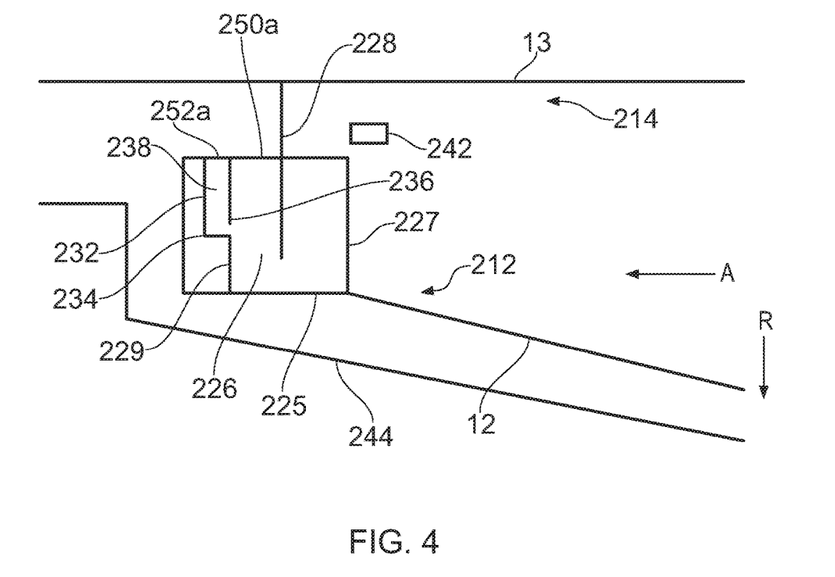
FIG. 4 is a cross-section on the line III-III of FIG. 2 as it would appear if this part of the seal arrangement were at bottom dead centre with the first rotating component rotating relatively slowly.
Figure 10:
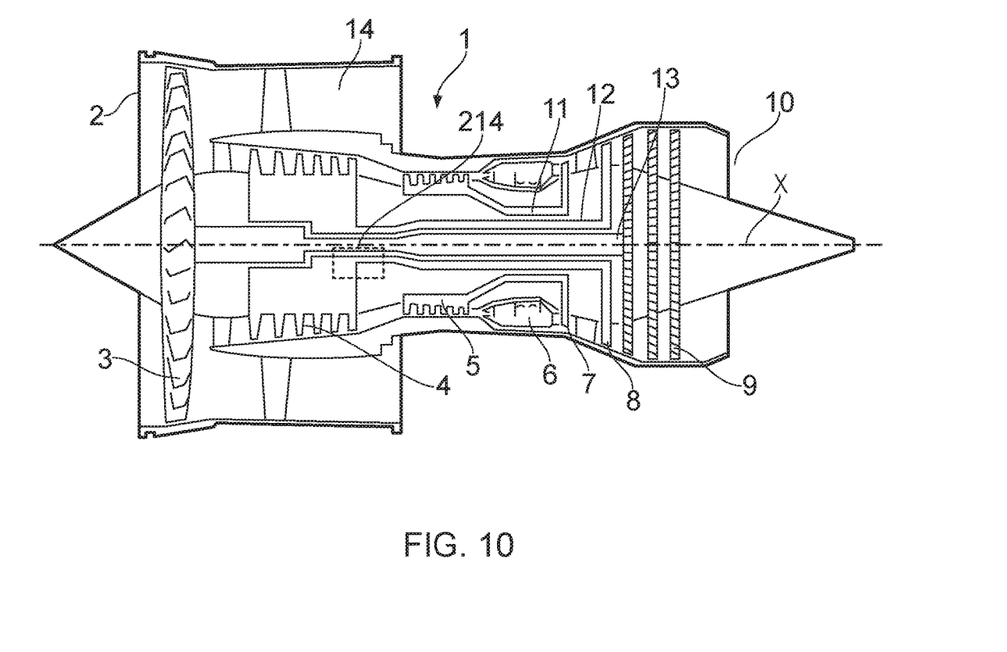
FIG. 10 is a cross sectional schematic view of a gas turbine engine according to the invention.

FIG. 4 is a cross-section on the line III-III of FIG. 2. The arrangement 210 comprises first and second components generally shown at 212 and 214. Each component 212, 214 comprises a respective shaft 216, 218, which in this case comprise relatively higher pressure and lower pressure shafts respectively of a gas turbine engine (schematically shown in FIG. 10). In the case of a three-shaft gas turbine engine, the relatively higher pressure shaft 216 may comprise the intermediate pressure shaft, and the relatively lower pressure shaft 218 may comprise the low pressure shaft. A housing 244 in the form of a ring seal housing or a bellows housing is provided radially outwardly of the arrangement 214 to contain the oil therein. The housing is static, and shields other components of the engine from the oily environment of the seal arrangement 214.

As shown in FIGS. 2 to 7, and in particular in FIGS. 4 to 7, first and second radially extending walls 227, 229 of the first component 212 extend radially inwardly from the relatively higher pressure shaft (in this case the intermediate pressure shaft 12), and a first axially extending wall 225 extends between the radially extending walls 227, 229 to define an annulus in the form of a first annular trough 226 therebetween. A radially outwardly extending web 228 extends from the relatively lower pressure shaft (in this case the low pressure shaft 13) of the second component 214 between the walls 227, 229.

The first component 212 further comprises a third radially inwardly extending wall 232, which extends from the relatively higher pressure, higher speed shaft 12. The third radially inwardly extending wall 232 is spaced from the second radially inwardly extending wall 229 by a second axially extending wall 234 to define a second annular trough 238. The trough 238 is open at a radially inner end, such that fluid communication between the first and second troughs 226, 238 is provided by the radially inner end of the second radially extending wall 229 The geometry of the walls 228, 232 234 and so the cross sectional area of the second trough 238 varies circumferentially, as described below.

At a first circumferential position corresponding to the cross section shown at lines III-III and in FIG. 4, the second radially extending wall 229 comprises a second trough 238 oil inlet in the form of a first aperture 236 located at a position part way along the radial extent of the wall, radially inwardly from a radial outer end of the web 228, and radially inwardly of the second axially extending wall 234, such that fluid communication is provided between the first and second troughs 226, 238 by the aperture 236. The third radially extending wall 232 and second axially extending wall 234 are located at a first position to define a first cross sectional area between the radially inner end of the second trough 238 defined by the radially inner end of the third radially extending wall 232 and the radially outer end of the second trough 238 defined by the radially inner surface of the second axially extending wall 234. The first circumferential position extends circumferentially part way around the circumference from a first circumferential point 262 to a second 264, such that the second trough 238 defines a first oil containing volume $V_1$ defined by the cross sectional area of the second trough as defined above, integrated over the circumferential extent of the first circumferential position, between points 262 and 264. The points 262, 264 are defined by the intersections between a notional line extending horizontally when the oil inlet 236 is at bottom dead centre at a radial position corresponding to the radial position of the oil inlet 236, and the second axially extending wall 234. Consequently, the first volume $V_1$ corresponds to the volume of oil contained within the second trough 238 when the oil inlet 236 is at bottom dead centre, and the first component 212 is stationary or rotating slowly. An optional similar arrangement is provided at the diametrically opposite position of the component, such that a pair of first apertures 236 are provided at opposite sides of the first component.

Figure 3:
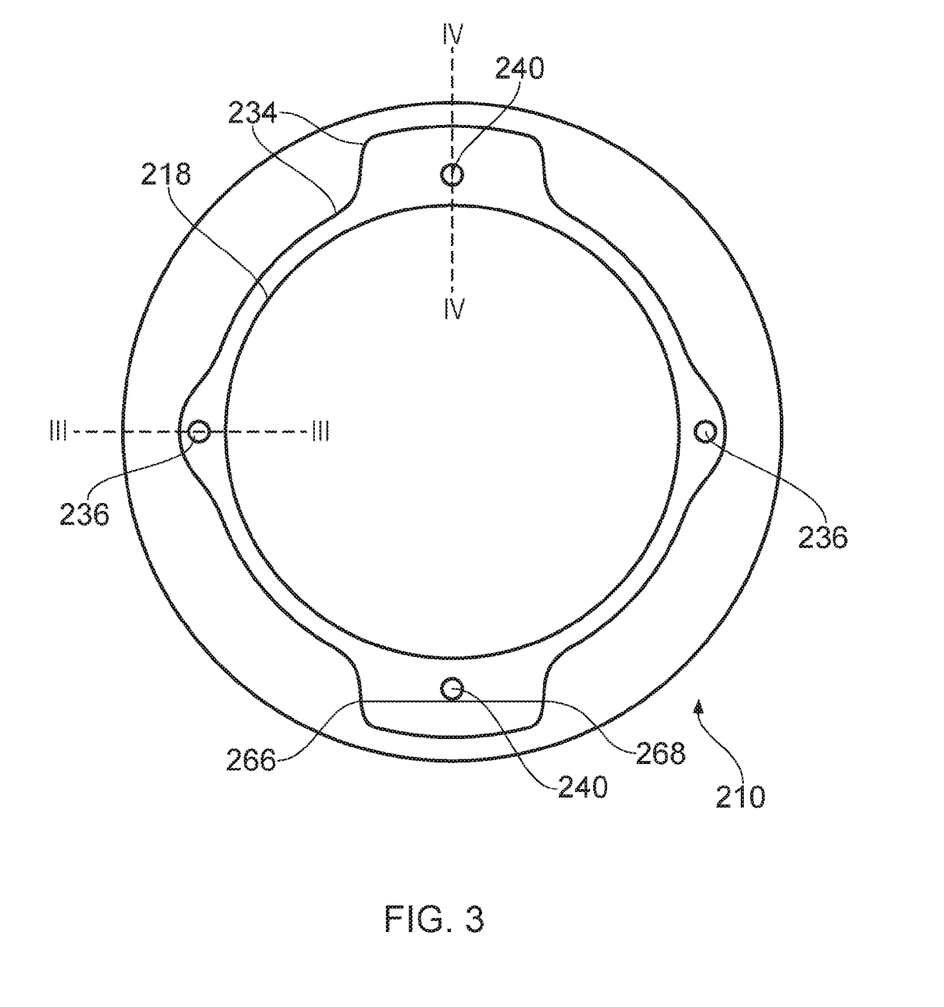
FIG. 3 is a section through the arrangement of FIG. 2 at a second rotational position.
Figure 5:
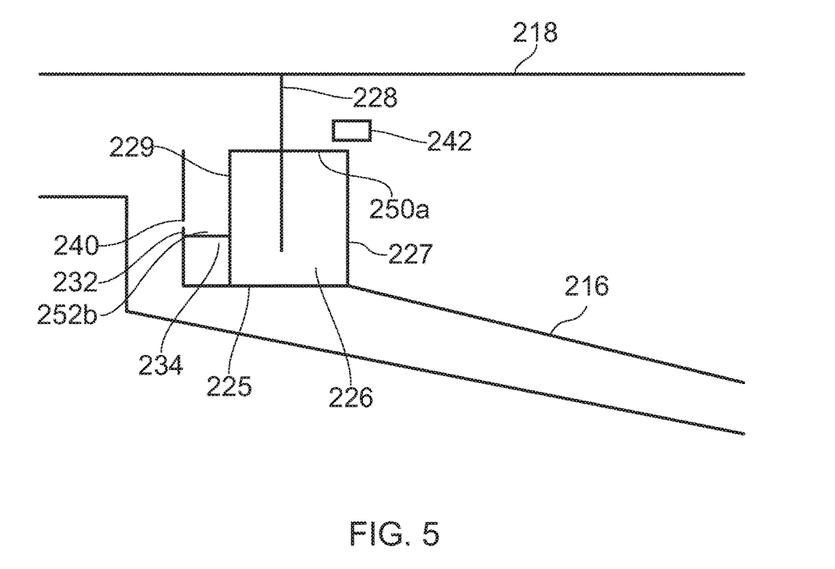
FIG. 5 is a cross-section on the line IV-IV of FIG. 2, as it would appear if this part of the seal arrangement were at bottom dead centre with the first rotating component stationary or rotating relatively slowly.

FIG. 5 shows a cross section through a second circumferential position corresponding to the cross section shown at lines IV-IV and in FIG. 3. The second circumferential position extends part way around the circumference between circumferential points 266, 268, as shown in FIG. 3. At the second circumferential position, the second radially extending wall 228 is continuous, with no first aperture being provided, such that the only fluid communication between the first and second troughs 226, 238 is provided by the radially inner end of the second radially extending wall 229. However, the third radially extending wall 232 of the first component comprises a second trough oil outlet in the form of a second aperture 240 located at approximately the same radial position as the first aperture 236, such that fluid communication between the second trough 238 and an oil scavenging means (not shown) is provided by the aperture 240. The third radially extending wall 232 and second axially extending wall 234 are located at a second position to define a second cross sectional area between the radially inner end of the second trough 238 defined by the radial position of the second aperture 240 and the radially outer end of the second trough 238 defined by the radially inner surface of the second axially extending wall 234. In this case, the third wall 232 is axially spaced from the second wall 229 by a greater distance than at the first circumferential position, the second axially extending wall 234 is located radially outwardly compared to the first circumferential position, and the points 266, 268 are circumferentially spaced such that the second circumferential position defines a second oil containing volume $V_2$ which is at least as large or larger than the first cross volume $V_1$.

The first and second circumferential positions are offset by 90°, such that the first and second apertures 236, 240 are circumferential separated by 90°, as shown in FIGS. 2 and 3. At locations in between, the second axially extending wall 234 varies its radial extent continuously between those found at the first and second circumferential position, as shown in FIGS. 2 and 3 to aid circumferential oil flow in use. In particular, the second axially extending wall 234 has approximately the same radial extent as at the second circumferential position for a significant circumference of the first component 212 (approximately 10% as shown in FIG. 2). Consequently, a relatively large volume is defined by the second trough 238 at the second circumferential position, and extending partly around the circumference either side. At some points between the first and second circumferential positions (for example at location 260 shown in FIG. 2), the second axially extending wall 234 is positioned radially inwardly compared to either the first or second circumferential positions. In any case, at all intermediate circumferential positions, the oil containing volume within the second trough 238 must be the same or greater than at the first circumferential position, such that oil cannot flow over the third radially extending wall 232 during slow rotation. At these intermediate circumferential positions, neither an oil inlet aperture 236 nor an oil outlet aperture 240 are provided, though the second trough 238 remains open at the radially inner end.

The arrangement 210 further comprises an oil delivery device in the form of an oil sprayer (not shown), which provides oil to a first axial side of the first trough 226.

When the relatively rotating components 212, 214 are rotating at relatively low rotational speeds, the arrangement 210 operates as follows, and as shown in FIGS. 2 to 5. At a first rotational position, with the first circumferential position at bottom dead centre as shown in FIGS. 2 and 4, oil is provided within the first and second troughs 226, 238, which may remain from previous operation, and fills to a level 250a within the first trough 226, and a level 252a within the second trough 238 by entering the second trough 238 via the first aperture 236 and, depending on the oil level, over the radially inner end of the second radially extending wall 229.

At a second rotational position, with the second circumferential position at bottom dead centre as shown in FIGS. 3 and 5, oil remains at the level 250a within the first trough 226 in view of the lack of a first aperture 236 at this circumferential position, and fills to a level 252b within the second trough 238 in view of the different axial and radial extent of the third radially extending wall 232 and axially extending wall 234 respectively, and so greater cross sectional area within the second trough 238 at the second circumferential position. Consequently, the oil fills to a level slightly below the second aperture 240, such that all of the oil within the first and second troughs 226, 238 remains therein, and the radially outer end of the web 228 remains within the oil at bottom dead centre, with the web 228 being located above the oil level at other circumferential positions. Consequently, the engine can rotate slowly without oil draining from the seal arrangement 210. Meanwhile, the oil level 250 within the first trough 226 remains above (i.e. radially inward) of the radially outer end of the web 228, ensuring that an oil seal is provided immediately on engine start-up, without any additional oil needing to be added.

Figure 6:
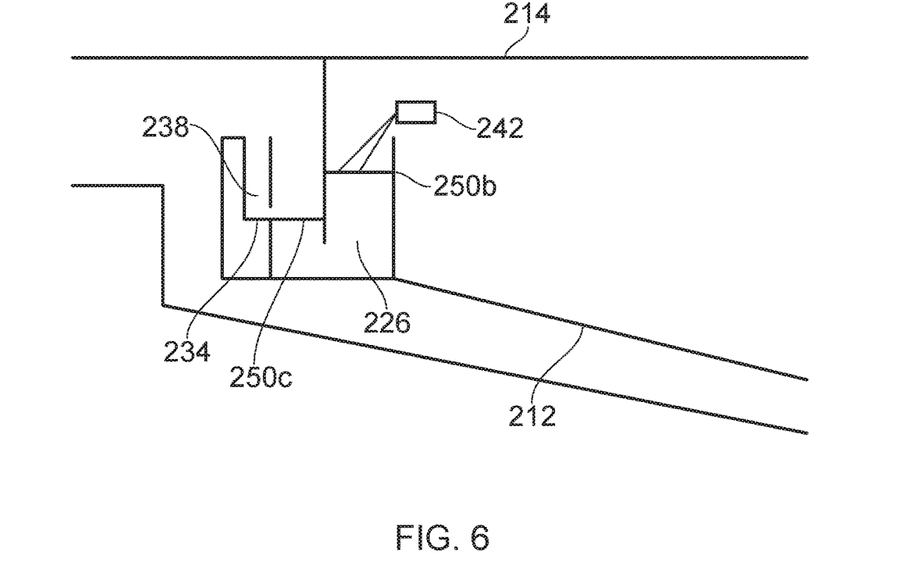
FIG. 6 is a cross-section on the line III-III of FIG. 2 as it would appear if this part of the seal arrangement were at bottom dead centre with the first rotating component rotating relatively quickly.
Figure 7:
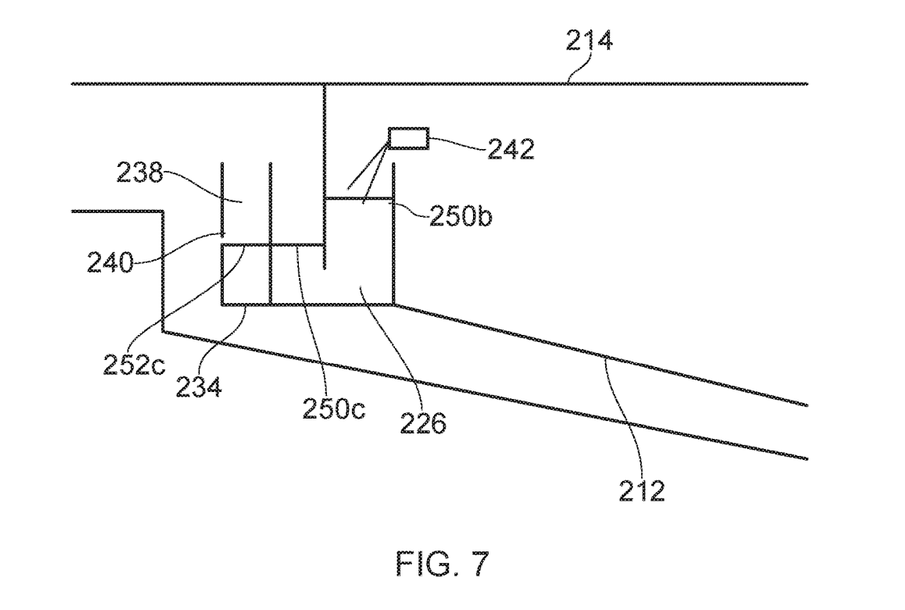
FIG. 7 is a cross-section on the line IV-IV of FIG. 2, as it would appear if this part of the seal arrangement were at bottom dead centre with the first rotating component rotating relatively quickly.

On the other hand, at higher rotational speeds, such as when the engine is running, the arrangement 210 operates as follows, and as shown in FIGS. 6 and 7. First, referring to FIG. 6, oil is supplied by the oil sprayer 242 to the first axial side of the first trough 226 where centrifugal and pressure effects dominate, such that the oil fills the first axial side of the trough to a fill level 250b. This oil flows round the web 228 to the second axial side of the first trough 226 to a fill level 250c. The fill level 250c at the second axial side of the trough is lower (i.e. radially outward) of the fill level 250b at the first axial side of the trough 226 due in part to high pressure air present on the second axial side, and part due to flow to the second trough 238 through the first aperture 236. In different circumstances (in particular if the pressure is reversed), the fill level 250c could be higher than the level 250b. The second trough 238 thus fills to an oil level 252c, which corresponds to the radial position of the second aperture 240. This flow of oil ensures that the oil does not overheat, while the oil level being radially inward of the radially outward end of the web 228 prevents air from the second axial side leaking to the first axial side.

As shown in FIG. 7, oil flows freely circumferentially in view of centrifugal effects, such that the oil level 250c on the second side of the first trough 226 and the oil level 252c within the second trough 238 is at the same radial position as at the first circumferential position, and is radially inward of the second aperture 240 (which is at the same radial position as the first aperture 236), and so oil flows out of the seal arrangement 210 to be scavenged.

Figure 8:
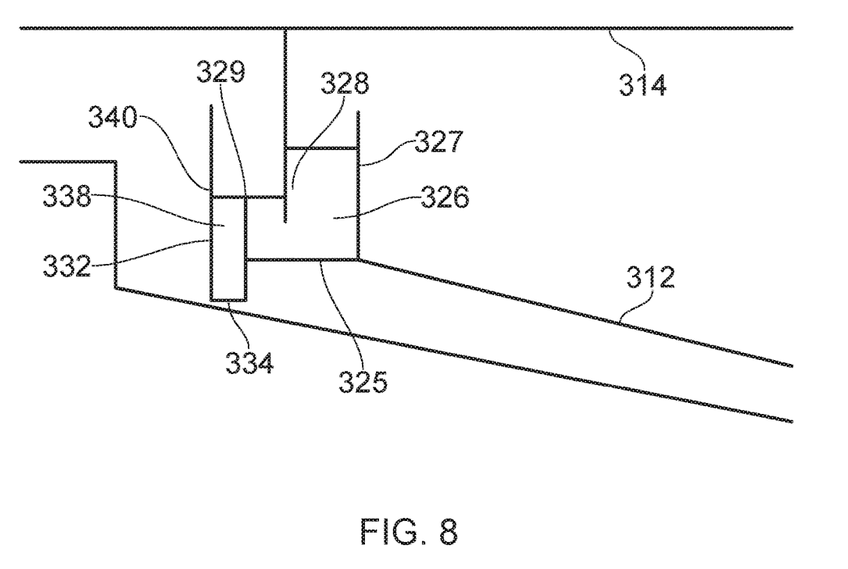
FIG. 8 is a view similar to that of FIG. 6, but of a second hydraulic seal arrangement according to the invention.

The arrangement shown in FIGS. 2 to 7 provides an effective oil seal arrangement, which minimises the proportion of the web 228 immersed in oil, thereby reducing heat transmitted to the oil, while simultaneously ensuring that sealing is provided on engine starting, while also being relatively straightforward to manufacture, requiring fewer welds. The arrangement also has a relatively small radial extent, and so is convenient for radially constrained situations.

Where the situation is instead axially constrained, an embodiment similar to that shown in FIG. 8 could be employed. FIG. 8 shows a similar arrangement to FIG. 7, with similar features being enumerated by similar reference numerals incremented by 100. In this embodiment, each of the components are similar, however, as shown in FIG. 8, at the second circumferential position, the third radially extending wall 332 is at the same axial position as at the first circumferential position. The second axially extending wall 334 extends further radially inwardly to compensate, such that the volume $V_2$ of the second trough 238 at the second circumferential position is the same or greater than the volume $V_1$ at the first circumferential position. Furthermore, in place of apertures, the second trough oil inlet is provided by the radially inner end of the second radially extending wall 329 at the first circumferential position, as shown in FIG. 8, such that the radially inner end of the wall 329 extending wall acts as a weir. Similarly, the second trough oil outlet is provided by the radially inner end of the third radially extending wall 332 at the second circumferential position, as shown in FIG. 9, such that the radially inner end of the wall 332 also acts as a weir.

It will be appreciated that various modifications may be made to the embodiments described in this specification without departing from the essential principles of the invention.

Figure 9:
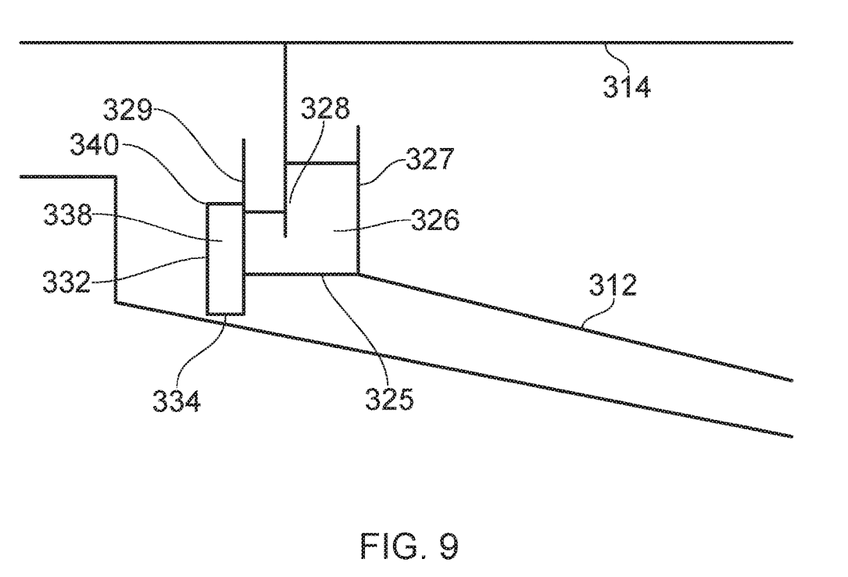
FIG. 9 is a view similar to that of FIG. 7, but of the second hydraulic seal arrangement of FIG. 8.

The arrangements of FIGS. 2 to 8 can be utilised in a gas turbine engine as shown in FIG. 9. The gas turbine engine 1 has a principal and rotational axis X. The engine 1 comprises, in axial flow series, an air intake 2, a propulsive fan 3, an intermediate pressure compressor 4, a high-pressure compressor 5, combustion equipment 6, a high-pressure turbine 7, and intermediate pressure turbine 8, a low-pressure turbine 9 and an exhaust nozzle 10. High, intermediate and low pressure shafts 11, 12, 13 interconnect each of the high, intermediate and low pressure turbines 7, 8, 9 to a respective high and intermediate pressure compressor 5, 4 and the fan 3.

The gas turbine engine 1 works in the conventional manner so that air entering the intake 2 is accelerated by the fan 3 to produce two air flows: a first air flow into the intermediate pressure compressor 4 and a second air flow which passes through a bypass duct 14 to provide propulsive thrust. The intermediate pressure compressor 4 compresses the air flow directed into it before delivering that air to the high pressure compressor 5 where further compression takes place.

The compressed air exhausted from the high-pressure compressor 5 is directed into the combustion equipment 6 where it is mixed with fuel and the mixture combusted. The resultant hot combustion products then expand through, and thereby drive the high, intermediate and low-pressure turbines 7, 8, 9 before being exhausted through the nozzle 10 to provide additional propulsive thrust. The high 7, intermediate 8 and low 9 pressure turbines drive respectively the high pressure compressor 5, intermediate pressure compressor 4 and fan 3, each by suitable interconnecting shaft 11, 12, 13. Seal arrangement is provided at a location as generally shown in box 214.

The first and second apertures in the embodiment described are separated at 90° from one another, but may be at different angular separations. The first and second apertures could be at different radial positions relative to one another. As will be understood, the oil level within the first trough during normal operation running will be determined by the radially innermost of the first and second apertures, while the oil level within the second trough will be determined by the radial position of the oil outlet aperture. It will be understood that the axially and radially extending walls do not have to extend entirely axially and radially, and could extend in different directions to some extent. Similarly, it will be understood that the walls do not have to be distinctly delineated by sharp edges, but could curve continuously. Though the seal has been described as being in relation to an arrangement in which a relatively slowly rotating trough and a relatively faster rotating fin in use is provided, it will be understood that the fin could rotate more slowly than the shaft, provided the walls of the trough extend radially inwardly, and the fin extends radially outwardly. Though two first and second apertures are provided in the examples, it will be understood that only one of each is required, and either of these could be replaced with a variable radial height wall, as shown in FIGS. 8 and 9. Alternatively, further oil inlets and outlets could be provided at further circumferential positions.

What is claimed is:

1. A hydraulic seal arrangement for a rotating machine comprising:
   first and second relatively rotatable components, the first component defining a first annular trough defined by radially inwardly extending axially spaced first and second walls, the second component defining a radially outwardly extending web extending between the radially inwardly extending walls of the first component; the first component further comprising:
   a second trough defined by the radially inwardly extending second wall and a radially inwardly extending third wall axially spaced from the second radially extending wall, the second trough defining an open radially inner end defined by a radially inner end of the second radially extending wall such that the first and second annular troughs fluidly communicate around substantially the whole circumference of the first component via the radially inner end of the second radially extending wall; wherein
   at a first circumferential position, the second radially inwardly extending wall of the first component defines a second trough oil inlet providing fluid communication between the first and second annular troughs; and
   at a second circumferential position, the third radially extending wall of the first component defines a second trough oil outlet.

2. A hydraulic seal arrangement as claimed in claim 1, in which the first and second radially extending walls of the first component are axially spaced by a first axially extending wall provided at a radially outer end of the first and second radially extending walls.

3. A hydraulic seal arrangement as claimed in claim 1, in which the second and third walls are axially spaced by a second axially extending wall provided at a radially outer end of the second and third radially extending walls.

4. A hydraulic seal arrangement as claimed in claim 3, in which the second trough defines a first volume at the first circumferential position, and defines a second volume at the second circumferential position.

5. A hydraulic seal arrangement as claimed in claim 4, in which the second volume is equal to or greater than the first volume.

6. A hydraulic seal arrangement as claimed in claim 1, in which the second trough oil inlet and second trough oil outlet are located at the same radial position.

7. A hydraulic seal arrangement as claimed in claim 1, in which the second trough oil inlet is located radially inwardly from a radially outer end of the radially outwardly extending web of the second component.

8. A hydraulic seal arrangement as claimed in claim 1, in which the second and third walls of the first component are axially spaced to a greater extent at the second circumferential position than at the first circumferential position.

9. A hydraulic seal arrangement as claimed in claim 1, in which at the first circumferential position, the second axially extending wall is located at a first radial position, and at the second circumferential position, the second axially extending wall is located at a second radial position radially outwardly of the first radial position.

10. A hydraulic seal arrangement as claimed in claim 1, in which the second trough oil inlet and oil outlet are circumferentially spaced by 90° from one another.

11. A hydraulic seal arrangement as claimed in claim 1, in which a pair of second trough oil inlets and a pair of second trough oil outlets are provided at diametrically opposite circumferential positions.

12. A hydraulic seal arrangement as claimed in claim 1, in which the rotating machine is a gas turbine engine.

13. A hydraulic seal arrangement as claimed in claim 12, in which a first shaft of the gas turbine engine comprises or is coupled to the first component, and a second shaft of the gas turbine engine comprises or is coupled to the second component.

14. A hydraulic seal as claimed in claim 1, in which the second trough oil inlet comprises a first aperture provided in the second radially extending wall.

15. A hydraulic seal as claimed in claim 1, in which the second trough oil outlet comprises a second aperture provided in the third radially extending wall.

16. A gas turbine engine comprising a hydraulic seal arrangement in accordance with claim 1.

* * * * *